(12) United States Patent
Ishimaru

(10) Patent No.: US 12,235,157 B2
(45) Date of Patent: Feb. 25, 2025

(54) SPECTROMETRY DEVICE

(71) Applicant: NATIONAL UNIVERSITY CORPORATION KAGAWA UNIVERSITY, Takamatsu (JP)

(72) Inventor: Ichiro Ishimaru, Takamatsu (JP)

(73) Assignee: NATIONAL UNIVERSITY CORPORATION KAGAWA UNIVERSITY, Takamatsu (JP)

( * ) Notice: Subject to any disclaimer, the term of this patent is extended or adjusted under 35 U.S.C. 154(b) by 269 days.

(21) Appl. No.: 17/640,225

(22) PCT Filed: Aug. 28, 2020

(86) PCT No.: PCT/JP2020/032689
§ 371 (c)(1),
(2) Date: Mar. 3, 2022

(87) PCT Pub. No.: WO2021/044979
PCT Pub. Date: Mar. 11, 2021

(65) Prior Publication Data
US 2022/0316945 A1   Oct. 6, 2022

(30) Foreign Application Priority Data

Sep. 3, 2019 (JP) .................................. 2019-160764

(51) Int. Cl.
*G01J 3/02* (2006.01)
*G01J 3/453* (2006.01)

(52) U.S. Cl.
CPC ............. *G01J 3/0208* (2013.01); *G01J 3/453* (2013.01); *G01J 2003/4538* (2013.01)

(58) Field of Classification Search
CPC ... G01J 3/0208; G01J 3/453; G01J 2003/4538
See application file for complete search history.

(56) References Cited

U.S. PATENT DOCUMENTS

2013/0215428 A1  8/2013  Ishimaru
2015/0268097 A1  9/2015  Ishimaru

FOREIGN PATENT DOCUMENTS

JP  2012-058068 A  3/2012
JP  2016-142522 A  8/2016
(Continued)

OTHER PUBLICATIONS

Qi Wei et al: "Enhanced interference-pattern visibility using multislit optical superposition method for imaging-type two-dimensional Fourier pectroscopy",Applied Optics, vol. 54, No. 20, Jul. 8, 2015 (Jul. 8, 2015), p. 6254-6259. (Year: 2015).*
(Continued)

*Primary Examiner* — Uzma Alam
*Assistant Examiner* — Mohamed Doumbia
(74) *Attorney, Agent, or Firm* — Oliff PLC

(57) ABSTRACT

A spectrometry device wherein light rays emitted from an object face measurement point combine into one parallel light beam by an objective lens, this is divided into a first and second light beam by a phase shifter, and the first and second light beam emit toward a light-receiving face of a photodetector while providing an optical path length difference. A light-shielding plate is arranged on a face optically conjugate the object face respective to the objective lens, and only light passed through translucent portions of the light-shielding plate is directed to the objective lens. A lateral length of each light-shielding plate translucent portion and the interval between two adjacent translucent portions are based on the objective lens focal length, the distance from the phase shifter to the photodetector light-receiving face, a photodetector pixel pitch, a pixel length, and a predetermined wavelength range of the light emitted from the measurement point.

13 Claims, 13 Drawing Sheets

(56) References Cited

FOREIGN PATENT DOCUMENTS

| WO | 2014/054708 A1 | 4/2014 | | |
|---|---|---|---|---|
| WO | 2017/007024 A1 | 1/2017 | | |
| WO | WO-2017150062 A1 * | 9/2017 | ................ | G01J 3/45 |

OTHER PUBLICATIONS

"Proposal of One-Shot-type Spectroscopic-Tomography for Noninvasive Medical-measurement." In European Conference on Biomedical Optics, p. 879801. Optica Publishing Group, 2013. (Year: 2013).*
Jul. 26, 2023 Office Action Issued in Chinese Patent Application No. 202080061774.9.
Sato et al., Proposal of One-Shot-type Spectroscopic-Tomography for Noninvasive Medical-measurement, European Conference on Biomedical Optics, 2013.
Qi et al.; "Enhanced interference-pattern visibility using multislit optical superposition method for imaging-type two-dimensional Fourier spectroscopy;" Applied Optics; 2015; pp. 6254-6259; vol. 54, No. 20.
Nov. 24, 2020 Search Report issued in International Patent Application No. PCT/JP2020/032689.
Nov. 24, 2020 Written Opinion of the Internaional Searching Authority issued in International Patent Application No. PCT/JP2020/032689.
Sep. 12, 2022 Extended Search Report Issued in European Patent Application No. 20 861 438.8.

* cited by examiner

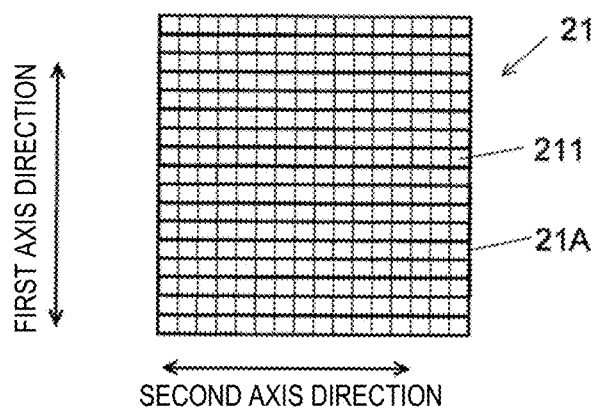
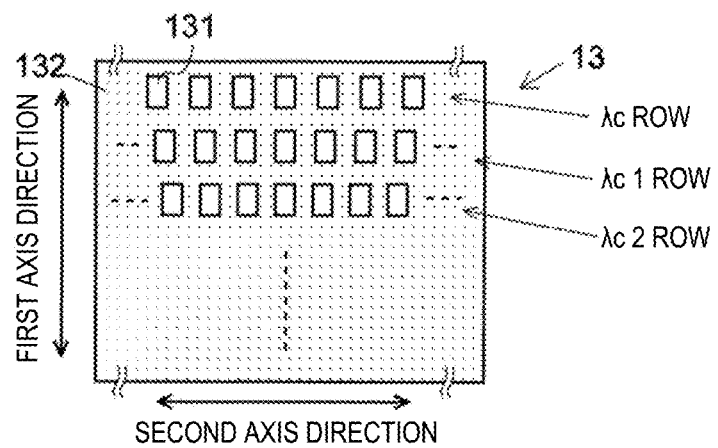

$$\frac{L}{L'} = \frac{M0}{M1}$$

SPECTROMETRY DEVICE

TECHNICAL FIELD

The present invention relates to a spectrometry device.

BACKGROUND ART

A method is known in which light is cast to a biological testing area, whereby biological components (such as glucose and cholesterol in blood) are qualitatively and quantitatively measured using spectral characteristics of object light such as transmitted light, diffused light, and scattered light emitted from the biological testing area. Methods for measuring spectral characteristics of object light include a method in which object light is converted into a parallel light beam by an objective lens, guided to a phase shifter, divided into two light beams having an optical path length difference by the phase shifter, and spectral characteristics are obtained from an intensity change of the interference light formed from these two light beams with respect to a phase difference between the both light beams. A method for providing two light beams with a phase difference is generally a method in which object light converted into parallel light beams are reflected by two mirrors arranged side by side to cause both light beams to interfere, and one of the two mirrors is moved in the optical axis direction. This method requires a moving mechanism for moving one mirror, and requires time for moving the mirror in order to measure the intensity change of the interference light.

Patent Literature 1 describes a method in which a mirror moving mechanism is unnecessary and an intensity change of the interference light is obtained at once.

The phase shifter disclosed in Patent Literature 1 includes two mirrors (reference mirror and inclined mirror) arranged side by side and having different inclinations of the reflection faces, and the parallel light beam introduced into the phase shifter is reflected by the reflection faces of the reference mirror and the inclined mirror, and is focused on the same straight line by an imaging optical system. Therefore, on this straight line (imaging straight line), a linear interference image is formed by the light (reference reflected light) reflected by the reference mirror and the light (inclined reflected light) reflected by the inclined mirror. Here, since the reflection face of the reference mirror and the reflection face of the inclined mirror have different inclinations, a continuous optical path length difference according to the angle formed by both the reflection faces is generated between the reference reflected light and the inclined reflected light on the imaging straight line. Accordingly, an interferogram can be acquired by detecting the light intensity change of the interference image along the imaging straight line. The spectral characteristics of the object light can be acquired by Fourier-transforming the interferogram.

In the method described in Patent Literature 1, the light intensity distribution (interferogram) of the interference image on the imaging straight line is affected by deviations in diffraction angle or the like due to the texture (surface condition) of the testing area. That is, since the light intensity distribution on the imaging straight line varies depending on the difference in the refractive index distribution or the like of the testing area and the optical texture of the point through which the object light passes, such a light intensity distribution is superimposed on the light intensity distribution (interferogram) of the interference image dependent on the concentration of the biological component, and the concentration of the biological component cannot be accurately measured.

In the case of spatially coherent light, high-order diffracted light is not generated from a testing area having almost no texture, and only 0th-order light is generated. For example, when Kohler illumination is cast to the testing area, the 0th-order light from the light source directly reaches the objective lens as a parallel light beam without being diffused or scattered in a testing area having almost no texture, and is focused on the reflection face of the reference mirror or the inclined mirror. In such a case, since the object light cannot be divided, the spectral characteristic cannot be acquired.

Another method has been proposed in which an image of object light is first formed on a plane (conjugate image plane) which is optically conjugate with an object face by a conjugate imaging optical system, and a spatial periodic change is given to the object light by an amplitude-type diffraction grating place on this conjugate image plane (Patent Literature 2). In the amplitude-type diffraction grating, rectangular translucent portions and light-shielding portions are alternately arrayed in a light focusing direction (which is the direction orthogonal to the above-described imaging straight line) of the imaging optical system. One of the translucent portions may be an opening having vertical and horizontal lengths (the length in the light focusing direction and the length in the direction along the imaging straight line) and an interval (period) of, for example, several tens μm to several hundreds μm, and is also called a multi-slit.

Even light from a testing area having almost no texture is diffracted in a direction corresponding to the wavelength of the light by passing through the multi-slit. Accordingly, a linear interference image can be obtained by guiding the diffracted light to the phase shifter via the objective lens, and the spectral characteristics of the light can be acquired from a light intensity change of the interference image along the imaging straight line.

CITATION LIST

Patent Literature

Patent Literature 1: JP 2012-058068 A
Patent Literature 2: WO 2014/054708 A
Patent Literature 3: JP 2016-142522 A

SUMMARY OF INVENTION

Technical Problem

By using the multi-slit, an interferogram can always be acquired from light emitted from a testing area of any texture. On the other hand, using the multi-slit may instead deteriorate the definition of the interferogram. The present inventor has studied the relationship between the definition of the interferogram and the multi-slit, and found necessary design conditions for the multi-slit to improve the definition of the interferogram (Patent Literature 3).

Patent Literature 3 describes that the definition of the interferogram is improved by appropriately setting the period of the translucent portions of the multi-slit and the length of the translucent portions in the light focusing direction based on the pixel pitch of the photodetector used to detect the light intensity of the interference image and the optical magnification of the imaging optical system.

The detection sensitivity of the photodetector depends on the amount of light reaching the photodetector, i.e., the size of the translucent portions of the multi-slit. However, as described above, the length of a translucent portion in the light focusing direction is restricted regarding the definition of the interferogram. In order to increase the detection sensitivity of the photodetector, then, the length in the interference direction (the direction along the imaging straight line) may be increased. However, when the length of a translucent portion in the interference direction is increased, object light emitted in various directions passes through the translucent portion, and thus the interference definition is rather lowered.

A problem to be solved by the present invention is to improve detection sensitivity and interference definition in a spectrometry device.

Solution to Problem

A first aspect of a spectrometry device according to the present invention made to solve the above problem includes:

a) a combining optical system configured to combine rays of light emitted from a measurement point on an object face into one single parallel light beam;

b) a photodetector having a light-receiving face on which a plurality of pixels are arrayed at predetermined intervals along a predetermined direction;

c) a phase shifter configured to divide the parallel light beam into a first light beam and a second light beam, and configured to provide an optical path length difference between the first light beam and the second light beam;

d) an interference portion configured to generate interference light by causing the first light beam and the second light beam to interfere with each other on the light-receiving face, where an optical path length difference is given between the first light beam and the second light beam by the phase shifter;

e) a light-shielding member having a plurality of translucent portions arrayed at predetermined intervals along a direction of the array of the plurality of pixels, the light-shielding member being arranged on the object face or a surface optically conjugate with the object face with respect to the combining optical system; and f) a processing unit configured to obtain an interferogram of the measurement point based on an intensity distribution of the interference light detected by the photodetector, and configured to acquire a spectrum by Fourier-transforming the interferogram, wherein there is a predetermined relationship between a length of each of the translucent portions of the light-shielding member in the array direction and an interval between two translucent portions adjacent to each other in the array direction, and a wavelength of light emitted from the measurement point, a distance from the combining optical system to the phase shifter, a distance from the phase shifter to a light-receiving face of the photodetector, a length of one of the pixels in a direction where the pixels are arrayed, and a difference in optical path length difference given to each of two pixels adjacent to each other in the array direction.

A second aspect of the spectrometry device according to the present invention includes:

a) a combining optical system configured to combine rays of light emitted from a measurement point on an object face into one single parallel light beam;

b) a phase shifter configured to divide the parallel light beam into two in a predetermined first axis direction to form a first light beam and a second light beam, and configured to provide an optical path length difference between the first light beam and the second light beam, the optical path length difference continuously changing along a second axis direction orthogonal to the first axis direction;

c) an imaging optical system configured to focus, in the first axis direction, the first light beam and the second light beam between which an optical path length difference is given by the phase shifter, on an imaging plane, to form a linear interference image along the second axis direction;

d) a photodetector having a light-receiving face on the imaging plane and having a plurality of pixels for detecting a light intensity distribution of the linear interference image;

e) a light-shielding member having a plurality of translucent portions arrayed at predetermined intervals in the second axis direction, the light-shielding member being arranged on the object face or on a surface optically conjugate with the object face with respect to the combining optical system; and f) a processing unit configured to obtain an interferogram of the measurement point based on an intensity distribution of light in a linear region detected by the photodetector, and configured to acquire a spectrum by Fourier-transforming the interferogram, wherein when a focal length of the combining optical system is f1, a focal length of the imaging optical system is f2, an interval of pixels of the photodetector in the second axis direction is P, a difference in optical path length difference given to each of two pixels adjacent to each other in the second axis direction is $\Delta\lambda$, a predetermined wavelength included in a wavelength range of light emitted from the measurement point is $\lambda c$, and both a length of each of the translucent portions of the light-shielding member in the second axis direction and an interval of two translucent portions adjacent to each other in the second axis direction are L, L is expressed by a following Formula (1)

$$L=\{(\lambda c \times f1)/(4\times \Delta\lambda \times f2)\}\times P \qquad (1).$$

A third aspect of the spectrometry device according to the present invention includes:

a) a combining optical system configured to combine rays of light emitted from a plurality of measurement points on an object face into one single parallel light beam;

b) a photodetector having a plurality of pixels arranged on a light-receiving face;

c) a phase shifter configured to divide a parallel light beam combined in the combining optical system into two in a predetermined first axis direction to form a first light beam and a second light beam, configured to emit the parallel light beam toward the light-receiving face while providing an optical path length difference between the first light beam and the second light beam, the optical path length difference continuously changing along a second axis direction orthogonal to the first axis direction, and configured to cause the first light beam and the second light beam to planarly enter the light-receiving face so that at least a part of an incident region of the first light beam on the light-receiving face and at least a part of an incident region of the second light beam overlap with each other;

d) a light-shielding member having a plurality of translucent portions arrayed at predetermined intervals in the second axis direction, the light-shielding member being arranged on the object face or on a surface optically conjugate with the object face with respect to the combining optical system; and e) a processing unit configured to obtain an interferogram at the measurement point based on an intensity distribution of light along the second axis direction in a region where an incident region of the first light beam and an incident region of the second light beam on the light-receiving face overlap, and configured a acquire a spectrum by Fourier-transforming the interferogram, wherein when a focal length of the combining optical system is f, a distance from the combining optical system to the phase shifter is h1, a distance from the phase shifter to the light-receiving face is h2, an interval of the plurality of pixels in the second axis direction is P, a difference in optical path length difference given to each of two pixels adjacent to each other in the second axis direction is $\Delta\lambda$, a predetermined wavelength included in a wavelength range of light emitted from the measurement point is $\lambda c$, and both a length of each of the translucent portions of the light-shielding member in the second axis direction and an interval of two translucent portions adjacent to each other in the second axis direction are L, L is expressed by a following Formula (2)

$$L=[(\lambda c \times f)/\{2 \times \Delta\lambda \times (h1+h2)\}] \times P \qquad (2).$$

In the present invention, the combining optical system may be composed of one objective lens (collimator lens). Otherwise it may be composed of a condenser lens and an objective lens (collimator lens), or it can be composed of a condenser lens and an objective lens as well as a pinhole arranged at the common focal position of the both lenses. A concave mirror can also be used as the combining optical system.

The light-shielding member only needs to be configured such that light emitted from the measurement point passes through the translucent portions and does not pass through portions other than the translucent portions, and for example, by forming a plurality of openings in the light-shielding member, it is possible to make the openings the translucent portions.

The optical path length difference given to each of two pixels adjacent to each other in the second axis direction refers to an optical path length difference between the first light beam and the second light beam forming interference light detected by each pixel, and a difference in optical path length difference refers to a difference between an optical path length difference of the interference light detected by a certain pixel and an optical path length difference of the interference light detected by an adjacent pixel. In this case, the optical path length difference corresponding to each pixel may be an average value, a maximum value, or a minimum value.

In the second and third aspects of the present invention, the predetermined wavelength $\lambda c$ only needs to be included in a wavelength range of light emitted from the measurement point, and can be, for example, the central wavelength, the shortest wavelength, the longest wavelength, or the like of the wavelength range. The predetermined wavelength $\lambda c$ can be set at a wavelength specific to a certain component according to the purpose of obtaining the spectral characteristic of the measurement point when, for example, the concentration or type of the certain component is to be obtained.

In the spectrometry device of the first aspect, rays of light emitted from the measurement point are combined into a parallel light beam by the combining optical system, then introduced into the phase shifter, and divided into the first light beam and the second light beam by the phase shifter. The first light beam and the second light beam interfere on the light-receiving face of the photodetector by the interference portion. At this time, since a predetermined optical path length difference is given between the first light beam and the second light beam, an interference image of the first light beam and the second light beam is formed in a focusing region on the light-receiving face.

Since the light-shielding member is arranged on the object face or a face optically conjugate with the object face with respect to the combining optical system, an interference image by the light after passing through the translucent portions is formed on the light-receiving face. Therefore, the light intensity distribution of the interference image on the light-receiving face is detected by the photodetector and processed by the processing unit to obtain an interferogram, and this interferogram is Fourier-transformed to obtain the spectral characteristic of the measurement point.

In the spectrometry device of the second aspect, rays of light emitted from the measurement point are combined into a parallel light beam by the combining optical system, then introduced into the phase shifter, and divided into the first light beam and the second light beam by the phase shifter. The first light beam and the second light beam are focused in the first axis direction by the imaging optical system, and are focused in a linear region along the second axis direction on the imaging plane. At this time, since a predetermined optical path length difference is given between the first light beam and the second light beam, an interference image of the first light beam and the second light beam is formed in the linear region.

Since the light-shielding member is arranged on the object face or a face optically conjugate with the object face with respect to the combining optical system, an interference image by the light after passing through the translucent portions is formed in the linear region along the second axis direction on the imaging plane. Since a plurality of pixels of the photodetector are arranged on the imaging plane, the intensity distribution of the light of the interference image formed by the light having passed through the translucent portions is detected by the photodetector and processing by the processing unit to obtain an interferogram, and the interferogram is Fourier-transformed to obtain the spectral characteristic of the measurement point.

In the spectrometry device of the third aspect, rays of light emitted from the measurement point are combined into a parallel light beam by the combining optical system, then introduced into the phase shifter, and divided into the first light beam and the second light beam by the phase shifter, and the first light beam and the second light beam are caused to planarly enter the light-receiving face so that at least a part of an incident region of the first light beam on the light-receiving face and at least a part of an incident region of the second light beam overlap with each other. At this time, since a predetermined optical path length difference is given between the first light beam and the second light beam, an interference image of the first light beam and the second light beam is formed in a region (overlapping region) where incident regions of both light beams overlap.

Since the light-shielding member is arranged on the object face or a face optically conjugate with the object face with respect to the combining optical system, an interference image by the light after passing through the translucent portions is formed in the overlapping region on the light-receiving face. Since a plurality of pixels of the photodetector are arranged on the light-receiving face, the intensity distribution of the light in the overlapping region is detected by the photodetector and processed by the processing unit to obtain an interferogram, and the interferogram is Fourier-transformed to obtain the spectral characteristic of the measurement point.

Advantageous Effects of Invention

As described above, according to the spectrometry device of the present invention, since the light-shielding member having the plurality of translucent portions is arranged on the object face or a face optically conjugate with the object face with respect to the combining optical system, a clear interferogram can be acquired. Moreover, in the present invention, the light-shielding member can be easily designed since there is a predetermined relationship between a length of each of the translucent portions of the light-shielding member in the array direction and an interval between two translucent portions adjacent to each other in the array direction, and a wavelength of light emitted from the measurement point, a distance from the combining optical system to the phase shifter, a distance from the phase shifter to a light-receiving face of the photodetector, a length of the pixel in a direction where the pixels are arrayed, and a difference in optical path length difference given to each of two pixels adjacent to each other in the array direction.

BRIEF DESCRIPTION OF DRAWINGS

FIG. 2 is a view of a photodetector as viewed from a light-receiving face side.

FIG. 3 is a view of a light-shielding plate as viewed from an objective lens side.

DESCRIPTION OF EMBODIMENTS

Next, specific embodiments of the spectrometry device according to the present invention will be described.

First Embodiment

Figure 1A:
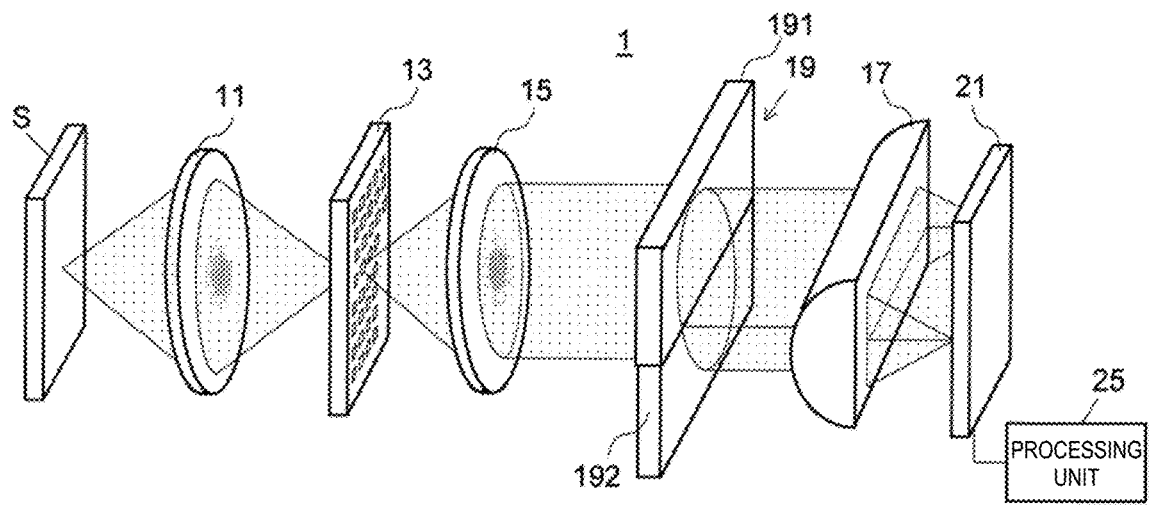
FIG. 1A is a perspective view showing an overall configuration of a spectrometry device according to a first embodiment of the present invention.
Figure 1B:
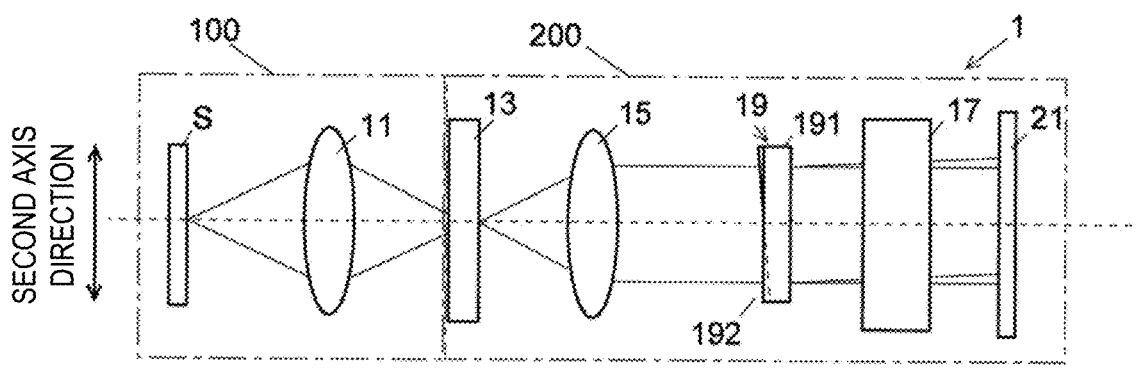
FIG. 1B is a top view of the spectrometry device shown in FIG. 1A.
Figure 1C:
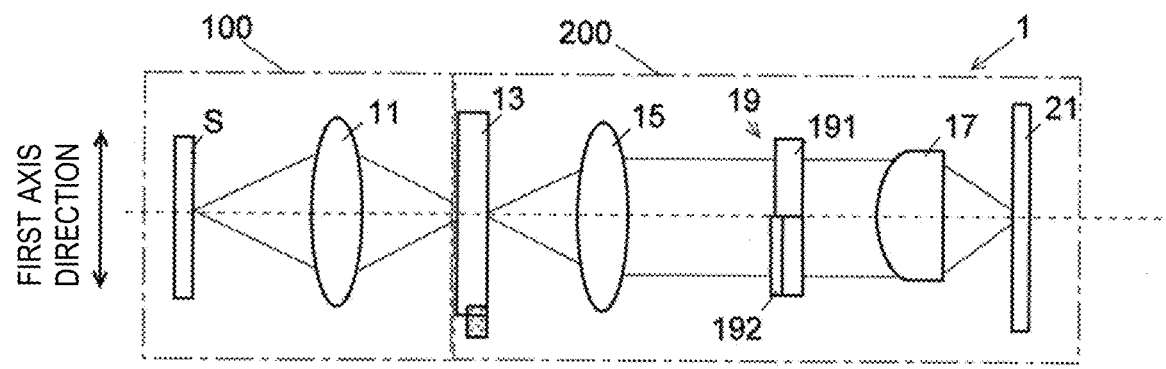
FIG. 1C is a side view of the spectrometry device shown in FIG. 1A.

FIGS. 1A to 1C are a perspective view, a top view, and a side view showing the configuration of a spectrometry device 1 of the first embodiment, respectively. This spectrometry device 1 includes a conjugate plane imaging optical system 100 and a transmission imaging one-dimensional Fourier spectroscopic optical system 200 (hereinafter referred to as "one-shot optical system 200"). The conjugate plane imaging optical system 100 forms an image of an object (object face) S to be measured on a plane optically conjugate with the object face by using a lens 11 (imaging lens, wide-angle lens, micro objective lens, and the like) according to the visual field range and magnification that are observation conditions. This conjugate plane is an object face of the one-shot optical system 200. A light-shielding plate 13 (corresponding to the light-shielding member of the present invention) is arranged on this conjugate plane.

The one-shot optical system 200 is an infinity correction imaging optical system including an objective lens (collimator lens) 15 and an imaging lens 17, where a phase shifter 19 is arranged in the vicinity of an optical Fourier-transformation plane, and a photodetector 21 is arranged in the vicinity of an imaging plane of the imaging lens 17. The photodetector 21 includes a two-dimensional area sensor such as a CCD camera in which a plurality of pixels are two-dimensionally arranged on an imaging plane of the imaging lens 17, a MOS image sensor, an InGaAs camera, a microbolometer, and an MCT sensor. A detection signal of the photodetector 21 is processed by a processing unit 25.

The phase shifter 19 includes a first transmission portion 191 and a second transmission portion 192, which are transmissive optical members. The first transmission portion 191 includes a rectangular plate-like optical member having a constant thickness in which a light incident face and a light emission face are parallel. The second transmission portion 192 includes a rectangular plate-like optical member having a light incident face inclined with respect to the light incident face of the first transmission portion 191 and an emission face on the same plane as the emission face of the first transmission portion 191. The direction in which the first transmission portion 191 and the second transmission portion 192 are arranged side by side (up and down direction in FIG. 1A) corresponds to the first axis direction of the present invention, and the direction orthogonal to both the first axis direction and the optical axis of an objective lens 15 corresponds to the second axis direction of the present invention. In the present embodiment, the second transmission portion 192 is configured such that the thickness at the center in the second axis direction is the same as the thickness of the first transmission portion 191, the thickness gradually decreases from the center toward the front side in FIG. 1A, and the thickness gradually increases toward the back side.

The imaging lens 17 includes a plano-convex cylindrical lens. The imaging lens 17 includes a cylindrical convex face in which a face on the phase shifter 19 side protrudes toward the phase shifter 19, and a plane in which a face on the photodetector 21 side is parallel to the emission face of the phase shifter 19.

FIG. 2 is a view of the photodetector 21 as viewed from a light-receiving face 21A side. As shown in FIG. 2, on the light-receiving face 21A of the photodetector 21, a plurality of pixels 211 are arranged at a predetermined pitch in each of the first axis direction and the second axis direction.

FIG. 3 is a view of the light-shielding plate 13 as viewed from the objective lens 15 side. The light-shielding plate 13 includes a plurality of translucent portions 131 through which light (object light) emitted from an object face can pass, and a light-shielding portion 132 through which the object light cannot pass, the light-shielding portion 132 being a part other than the translucent portions 131. The translucent portions 131 may be an opening formed on the light-shielding plate 13, or the translucent portions 131 may be obtained by fitting a member such as glass having translucency into the opening.

With the above configuration, in the spectrometry device 1 of the present embodiment, light emitted from the measurement point on the object face S is focused on the conjugate plane with respective to the objective lens 15 by the lens 11, passes through the translucent portions 131 of the light-shielding plate 13, and is directed to the objective lens 15. Then, after being combined into a parallel light beam by the objective lens 15, the light is divided into two light beams by the phase shifter 19. After a predetermined optical path length difference is given, the light beam is focused in a linear region along the second axis direction of the light-receiving face 21A of the photodetector 21 by the imaging lens 17 to form an interference image. Since the light intensity of the interference image formed on the light-receiving face 21A is detected by the photodetector 21, the processing unit 25 obtains an interferogram from the light intensity distribution of the interference image and Fourier-transforms the interferogram to obtain a spectrum of the measurement point.

As shown in FIG. 3, the plurality of translucent portions 131 are arranged at predetermined intervals in each of the first axis direction and the second axis direction. The present invention has been made by finding a condition (design condition) regarding the length of each of the translucent portions 131 in the second axis direction and the distance between two translucent portions 131 adjacent to each other for the plurality of translucent portions 131 arranged side by side in a row in the second axis direction, and is characterized by the design condition. Hereinafter, the design condition of the translucent portions 131 of the light-shielding plate 13 will be described.

Figure 4A:
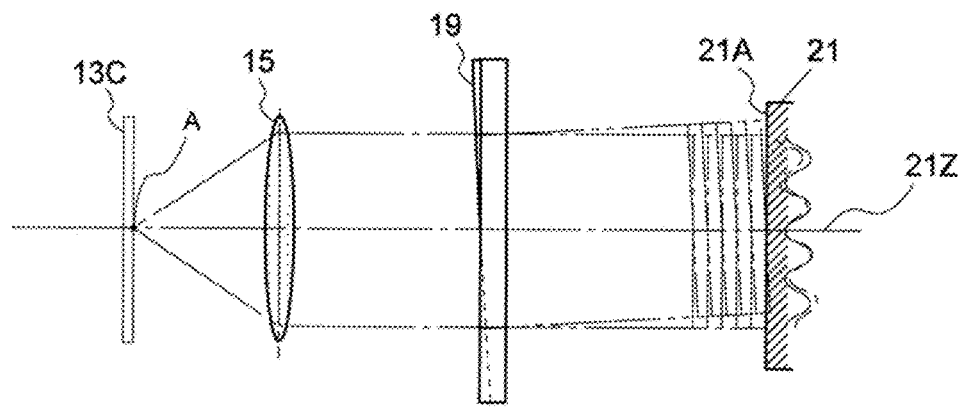
FIG. 4A is a view showing a scene in which rays of monochromatic light emitted from a certain measurement point of an object to be measure are combined into a parallel light beam by the combining optical system, then divided into the first light beam and the second light beam between which an optical path length difference is given by the phase shifter, and focused in a linear region on an imaging plane.
Figure 4B:
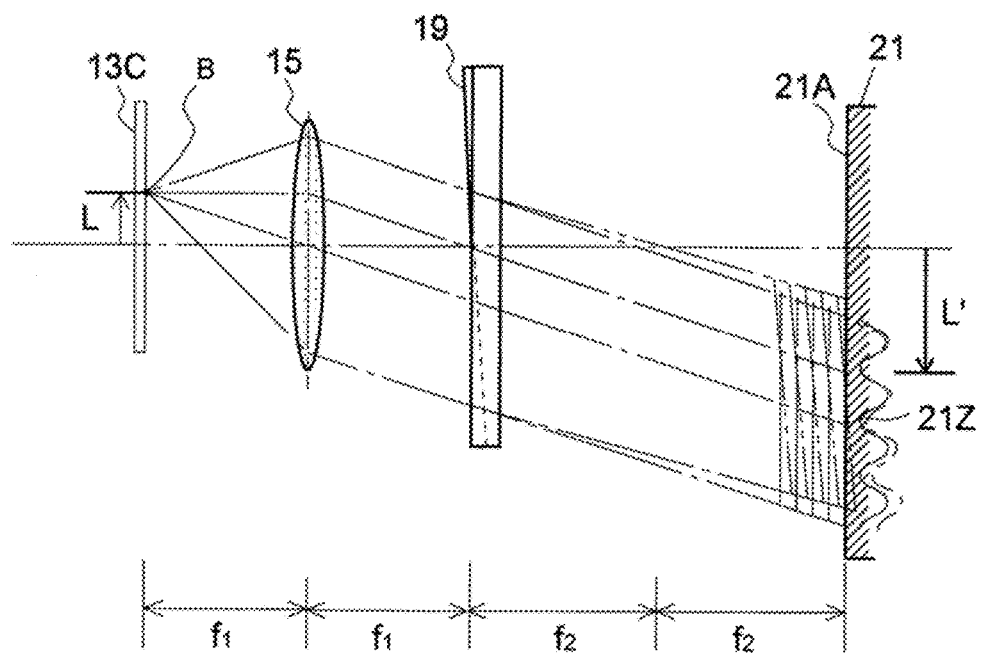
FIG. 4B is a view showing a scene in which rays of monochromatic light emitted from another measurement point of an object to be measure are combined into a parallel light beam by the combining optical system, then divided into the first light beam and the second light beam between which an optical path length difference is given by the phase shifter, and focused in a linear region on an imaging plane.

FIGS. 4A and 4B are optical path diagrams showing a scene in which light of a single wavelength (monochromatic light) emitted from a plurality of measurement points on the object face S is focused on a conjugate plane 13C, and then directed to the objective lens (combining optical system) 15. In practice, the light emitted from the plurality of measurement points is multi-wavelength light, but for convenience of description, the light will be described as monochromatic light.

FIG. 4A is an optical path diagram of the monochromatic light passing through a point A where the optical axis of the objective lens 15 and the conjugate plane 13C intersect, and FIG. 4B is an optical path diagram of the monochromatic light passing through a point B separated from the point A by a distance L in the second axis direction. As illustrated in these figures, the rays of monochromatic light are combined into the parallel light beam by the objective lens 15, then divided into two light beams having an optical path length difference by the phase shifter 19, and focused on a linear region on the light-receiving face (imaging plane) 21A of the photodetector 21 by the imaging lens 17 (not shown in FIGS. 4A and 4B).

The phase shifter 19 is arranged such that a line segment (optical path length difference=0) where the light incident face of the first transmission portion 191 and the light incident face of the second transmission portion 192 intersect coincides with the rear focal point of the objective lens 11. That is, the phase shifter 19 is arranged on a so-called Fourier-transform plane. When the wave front of the light beam (first light beam) that has entered the first transmission portion 191 of the phase shifter 19 and then reached the light-receiving face 21A is parallel to the light-receiving face 21A, the wave front of the light beam (second light beam) that has entered the second transmission portion 192 and then reached the light-receiving face 21A is inclined with respect to the light-receiving face 21A. At this time, of the first light beam and the second light beam that have reached the light-receiving face 21A, the phase difference between the first light beam and the second light beam is 0 (rad.) at the point (point indicated by reference numeral 21Z in FIGS. 4A and 4B (referred to as zero point 21Z)) where the light that has traveled in the direction parallel to the optical axis of the objective lens 15 from the point A and the point B and entered the first transmission portion 191 or the second transmission portion 192 has reached the light-receiving face 21A, whereas in the region on the upper side relative to the zero point 21Z, the phase of the second light beam is delayed from the phase of the first light beam, and the delay amount becomes larger as the distance from the zero point increases. On the other hand, in the region on the lower side relative to the zero point, the phase of the second light beam is ahead of the phase of the first light beam, and the ahead amount increases as the distance from the zero point increases. Accordingly, in the linear region where the first light beam and the second light beam are focused on the light-receiving face 21A, an interference image of the first light beam and the second light beam in which the phase difference continuously changes is formed.

Figure 5:
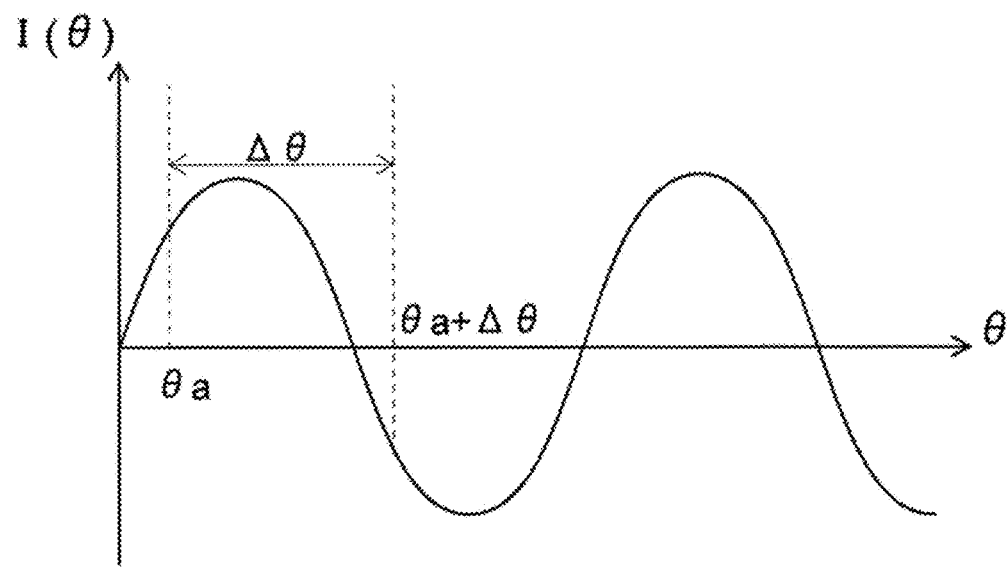
FIG. 5 is a view showing a change in intensity of light in an interference image formed on a light-receiving face.

FIG. 5 shows a change in intensity of light in an interference image formed on the light-receiving face 21A. In FIG. 5, the horizontal axis represents the position in the second axis direction on the object face S, and the vertical axis represents the light intensity of the interference image. Here, the coordinate in the second axis direction on the light-receiving face 21A is defined by a phase θ (rad.) in which the length of an interference fringe of one cycle of the monochromatic light (wavelength λ) is 2π. That is, a coordinate θ (rad.) where the distance in the second axis direction from an arbitrary point on the light-receiving face 21A is x (m) is defined by the following formula with the length (m) of one cycle of the interference fringe formed on the light-receiving face 21A is 2π (rad.).

$$\theta = x/\lambda \times 2\pi \quad (3)$$

For example, when an arbitrary position a (m) in the second axis direction on the light-receiving face 21A is a coordinate θa (rad.), I(θa) represents the intensity of light of the interference image at the coordinate θa (rad.), which is the arbitrary position a (m) in the second axis direction on the light-receiving face 21A. When converted into a distance on the light-receiving face 21A, I(θa+Δθ) represents the intensity of light of the interference image at a position separated from the coordinate a (m) by x=Δθ/2π×λ (m).

Figure 6:
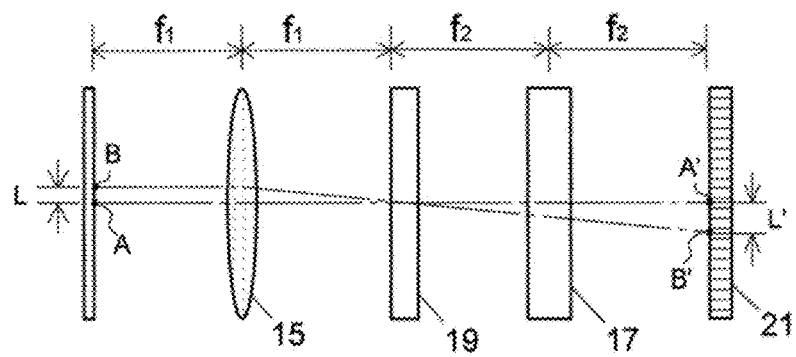
FIG. 6 is a view showing a positional relationship among a conjugate plane, an objective lens, the phase shifter, an imaging lens, and the light-receiving face.

As shown in FIG. 6, when the focal length of the objective lens 15 is f1 and the focal length of the imaging lens 17 is f2, the relationship between the distance L between the point A and the point B on the object face S and a distance L' between points A' and B' corresponding to the points A and B on the light-receiving face 21A is expressed by the following Formula (4). This ratio of L/L' is referred to as "conversion ratio to conjugate plane". This is determined by various known spatial phase shift interference optical systems, but is determined by Formula (4) in the case of the present embodiment. Specifically, as shown in FIG. 4B, a light beam parallel to the main axis between the conjugate plane 13C and the objective lens 15 passes through the rear focal point of the objective lens 15. That is, the distance L' on the light-receiving face 21A can be converted into the distance L of the conjugate plane 13C by the ratio of 2×f2 and f1.

$$L/L' = f1/(2 \times f2) \quad (4)$$

Here, it is considered a case where the light-shielding plate 13 is arranged on the conjugate plane 13C, and the point A and the point B are positioned at both ends of the length L of each of the translucent portions 131 of the light-shielding plate 13 in the second axis direction. That is, the point A and the point B are two points separated by the distance L on the conjugate plane 13C. This causes an interference fringe to be formed at each position deviating in the second axis direction by the distance L'=L×2×f2/f1 on the light-receiving face 21A. Since there are an infinite number of points between the point A and the point B, monochromatic light is also directed from those points toward the objective lens 15, and interference images of those monochromatic light are continuously formed on the light-receiving face 21A. As seen from FIGS. 4A and 4B, the zero point Z of the interference image formed on the light-receiving face 21A according to the emission position of the monochromatic light moves according to the conversion ratio to the conjugate plane. That is, the interference image of the monochromatic light having passed through the translucent portions 131 is formed on the light-receiving face 21A with their zero points deviating little by little in the second axis direction. Assuming that the shift amount of this coordinate is Δθ, the light intensity I(θa) of the interference image at the position a, i.e., the coordinate θa is a value obtained by integrating the graph (sine curve) of the light intensity I(θ) shown in FIG. 5 from θa to θa+Δθ, and can be obtained from the following formula.

[Math. 1]

$$\begin{aligned}
I(\theta a) &= A \times \int_{\theta a}^{\theta a + \Delta\theta} \{\sin\theta + 1\} d\theta \\
&= A \times [-\cos\theta + \theta]_{\theta a}^{\theta a + \Delta\theta} \\
&= A \times \{-\cos(\theta a + \Delta\theta) + (\theta a + \Delta\theta) + \cos\theta a - \theta a\} \\
&= A \times \{\cos\theta a - \cos(\theta a + \Delta\theta) + \Delta\theta\} \\
&= 2 \times A \times \sin\frac{\Delta\theta}{2} \times \sin\left(\theta a + \frac{\Delta\theta}{2}\right) + A \times \Delta\theta \\
I(\theta a) &= 2 \times A \times \sin\frac{\Delta\theta}{2} \times \sin\left(\theta a + \frac{\Delta\theta}{2}\right) + A \times \Delta\theta
\end{aligned} \quad (5)$$

The above formula is rearranged as the following Formula (5).

[Math. 2]

$$I(\theta a) = 2 \times A \times \sin\frac{\Delta\theta}{2} \times \sin\left(\theta a + \frac{\Delta\theta}{2}\right) + A \times \Delta\theta \quad (5)$$

Figure 7:
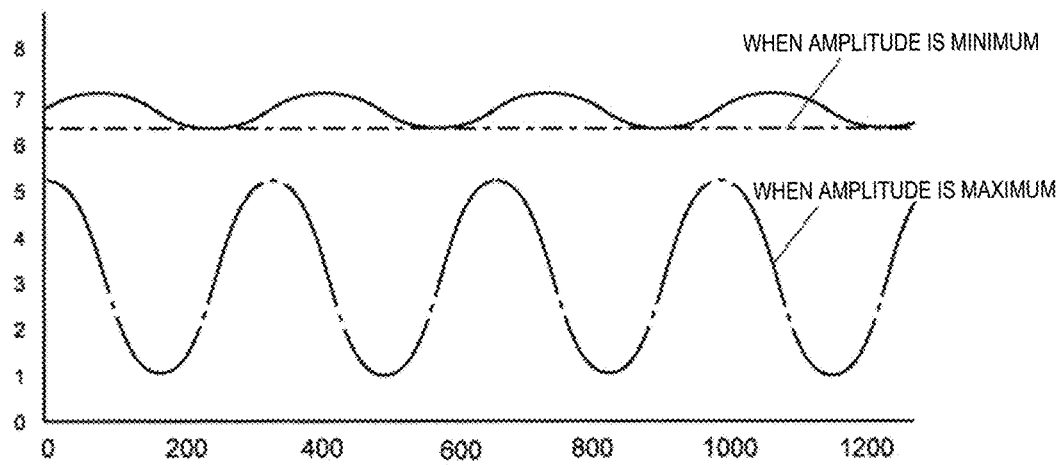
FIG. 7 is a view showing a change in amplitude of the light intensity of an interference image due to an increase in the length of each of the translucent portions in the second axis direction.

In Formula (5), 2A×sin(Δθ/2) represents the amplitude of the light intensity of the interference image, and A×Δθ represents the reference value (offset) of the light intensity. Formula (5) indicates that the amplitude of the light intensity of the interference image becomes a maximum value (2A) when the length Δθ of a translucent portion 131 in the second axis direction is (2m+1)×π (m is an integer of 0 or more), and becomes a minimum value (zero) when Δθ is 2n×π (n is an integer of 1 or more). That is, even if the length Δθ of the translucent portion 131 in the second axis direction is increased, the amplitude of the light intensity of the interference image only periodically changes between 0 and 2A and does not exceed 2A. On the other hand, the offset increases as the length Δθ of the translucent portion 131 in the second axis direction increases (see FIG. 7). In other words, when the length Δθ of the translucent portion 131 in the second axis direction is increased, the light intensity of the interference image increases, but the amplitude of the light intensity only periodically fluctuates between 0 and A×Δθ, and the ratio of the magnitude of the amplitude (change amount of the light intensity) to the light intensity value of the interference image decreases, so that the definition (interference definition) of the interferogram rather decreases.

On the other hand, when n translucent portions 131 having the length Δθ in the second axis direction are arranged side by side at the distance Δθ in the second axis direction, n interference images are formed to overlap the light-receiving face 21A by the monochromatic light passing through each translucent portion 131. At this time, the light intensity of the interference image formed on the light-receiving face 21A is expressed by the following Formula (6).

[Math. 3]

$$n \times I(\theta a) = 2 \times n \times A \times \sin\frac{\Delta\theta}{2} \times \sin\left(\theta a + \frac{\Delta\theta}{2}\right) + n \times A \times \Delta\theta \quad (6)$$

As seen from Formula (6), when the width Δθ of the translucent portion 131 in the second axis direction corresponds to π, the offset and the amplitude of the interference image increase according to the number of the translucent portions 131, and as a result, both the detection sensitivity and the interference definition are improved. Accordingly, when the wavelength included in the wavelength range of the light emitted from the measurement point of the object face S is λc, it is possible to improve the definition and the detection sensitivity of the interferogram by setting, to be the distance between the translucent portions 131, L obtained from the conversion ratio to the conjugate plane with half of the length of the interference fringe formed by the wavelength λc on the light-receiving face 21A as the distance L', and increasing the number of the translucent portions 131.

When the pixel pitch of the photodetector 21 is P, and a difference between an optical path length difference given to a certain pixel by the phase shifter and an optical path length difference of a pixel adjacent to the pixel in the second axis direction is Δλ (e.g., when the shortest wavelength of the wavelength band of the light emitted from the measurement point is λmin, it can be Δλ=λmin/4), the length L' on the light-receiving face 21A is expressed by the following Formula (7).

$$L' = \{(\lambda c/2)/\Delta\lambda\} \times P \quad (7)$$

The length of the translucent portion 131 of the light-shielding plate 13 in the second axis direction and the distance L between the adjacent translucent portions 131 are expressed by the following Formula (1) by the above-described Formulas (4) and (7) representing the relationship between the distance L and the distance L' and the conversion ratio to the conjugate plane determined by each optical system.

$$L = [\lambda c/\{(2 \times \Delta\lambda) \times (2 \times f2/f1)\}] \times P$$

$$= \{(\lambda c \times f1)/(4 \times \Delta\lambda \times f2)\} \times P \quad (1)$$

From above, according to the present embodiment, when the pixel pitch P of the photodetector 21, the difference Δλ in optical path length difference between the two pixels adjacent to each other in the second axis direction, the wavelength λc included in the wavelength range emitted from the measurement point, and the focal lengths f1 and f2 of the objective lens 15 and the imaging lens 17 are known, it is possible to enhance the definition of the interferogram by designing the length L in the second axis direction of each translucent portion 131 of the light-shielding plate 13 and the interval L in the second axis direction of the translucent portions 131 based on these values.

Note that it is preferable that "L" is a value that satisfies the above Formula (1). However, in a case where the amount of light passing through the translucent portions decreases when "L" is set to a value obtained from Formula (1), a value obtained by multiplying the value obtained from Formula (1) by an odd number may be set as "L".

Since the interval L is designed in accordance with the focused single wavelength λc, the interference definition of the wavelength λc is most efficiently improved. In the case of spectroscopy, since light of multi-wavelength is simultaneously handled, there is a case where it is desired to simultaneously improve the interference definition of wavelengths other than the wavelength λc. In this case, the wavelength λc1 and the wavelength λc2 to be focused on may be changed and set for each horizontal row having different coordinates in the first axis direction of the light-shielding plate 13A (see FIG. 3).

EXAMPLES

Figure 8A:
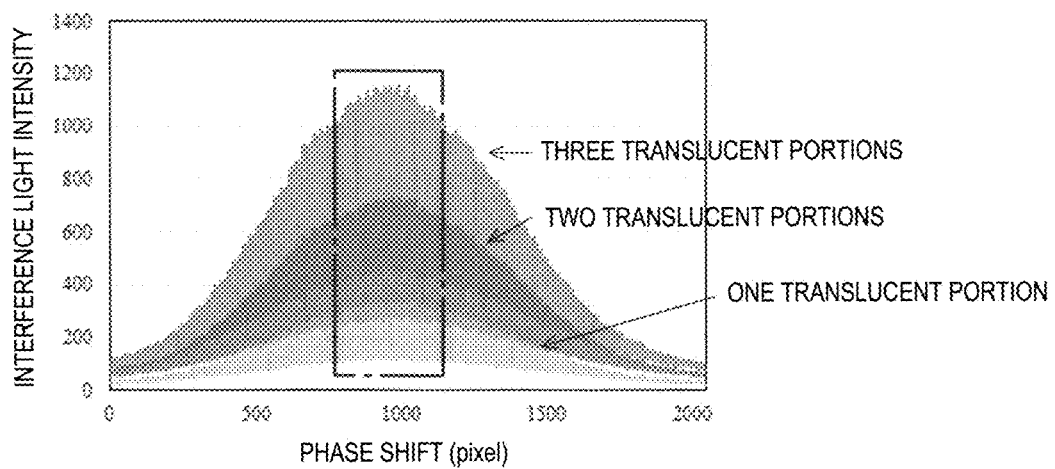
FIGS. 8A(a) and 8A(b) are views showing results of actually measuring an intensity change in an interference image of HeNe laser light when the light-shielding plate is arranged on the conjugate plane, and FIG. 8A(b) is a partially enlarged view of FIG. 8A(a).
Figure 8A:
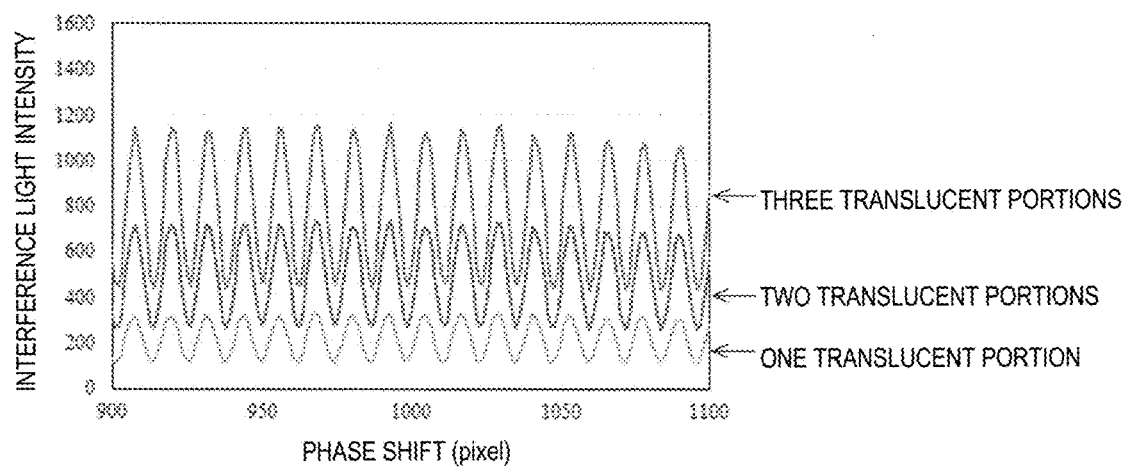

The intensity change of the interference image obtained when the light-shielding plate 13 (specifically, the light-shielding plate 13 in which both the distance L and the interval L in the second axis direction of the translucent portions 131 are 15.57 μm) having one to three translucent portions (openings) 131 designed to satisfy the above-described Formula (1) was arranged on the conjugate plane 13C of the spectrometry device was measured. This is a case where the focal lengths f1 and f2 are equal, the conversion ratio to the conjugate plane is ½, and the interference optical system such as the inclination of the phase shifter is designed such that the length of the interference fringe formed on the light-receiving face 21A is 62.28 μm. The results are shown in FIGS. 8A(a) and 8A(b) and FIGS. 9A(a) and 9A(b). FIGS. 8A(a) and 8A(b) are measurement results when monochromatic light (wavelength=633 nm) emitted from an HeNe laser is incident on the objective lens 15, and FIGS. 9A(a) and 9A(b) are measurement results when white light emitted from a metal halide lamp is incident on the objective lens 15. FIGS. 8A(b) and 9A(b) are obtained by enlarging a part surrounded by a rectangular frame in FIGS. 8A(a) and 9A(a) in the horizontal axis direction.

Figure 8B:
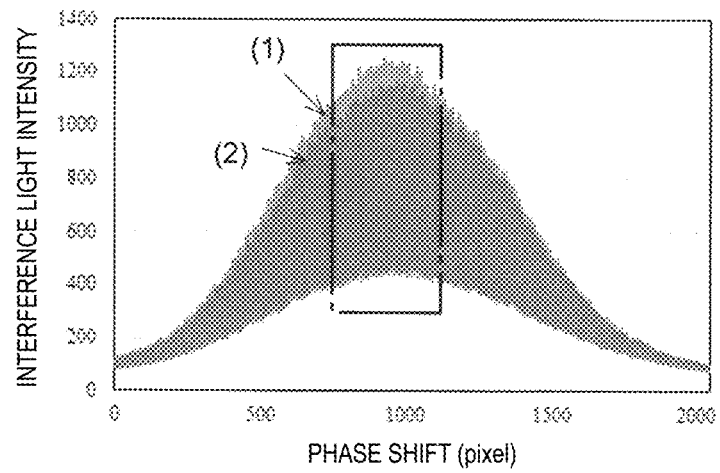
FIGS. 8B(a) to 8B(c) are views showing results of actually measuring an intensity change in an interference image of HeNe laser light when the light-shielding plate is arranged on the conjugate plane, which is performed for comparison, and FIG. 8B(b) is a partially enlarged view of FIG. 8B(a).
Figure 8B:
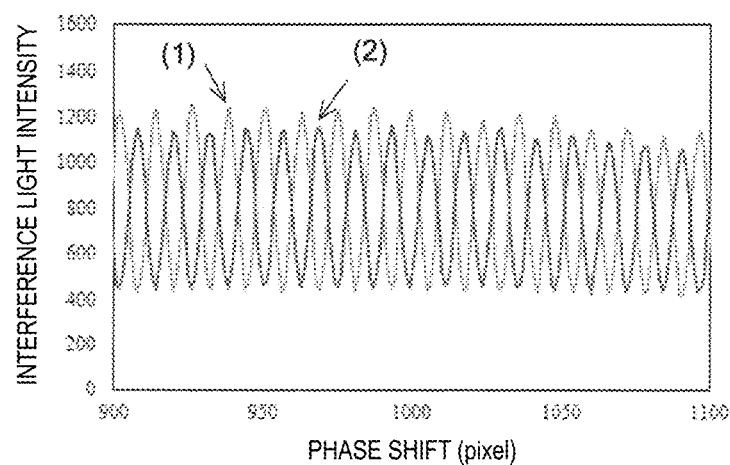
Figure 8B:
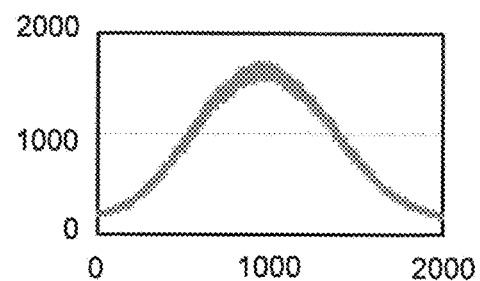
Figure 9A:
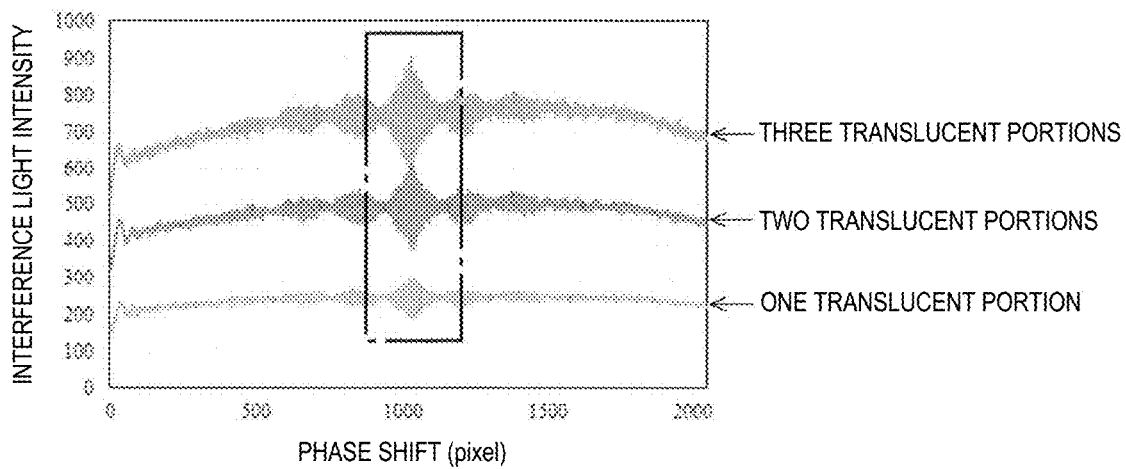
FIGS. 9A(a) and 9A(b) are views showing results of actually measuring an intensity change in an interference image of white light (light source: metal halide lamp) when the light-shielding plate is arranged on the conjugate plane, and FIG. 9A(b) is a view in which a part surrounded by a rectangular frame in FIG. 9A(a) is enlarged in a horizontal axis direction.
Figure 9A:
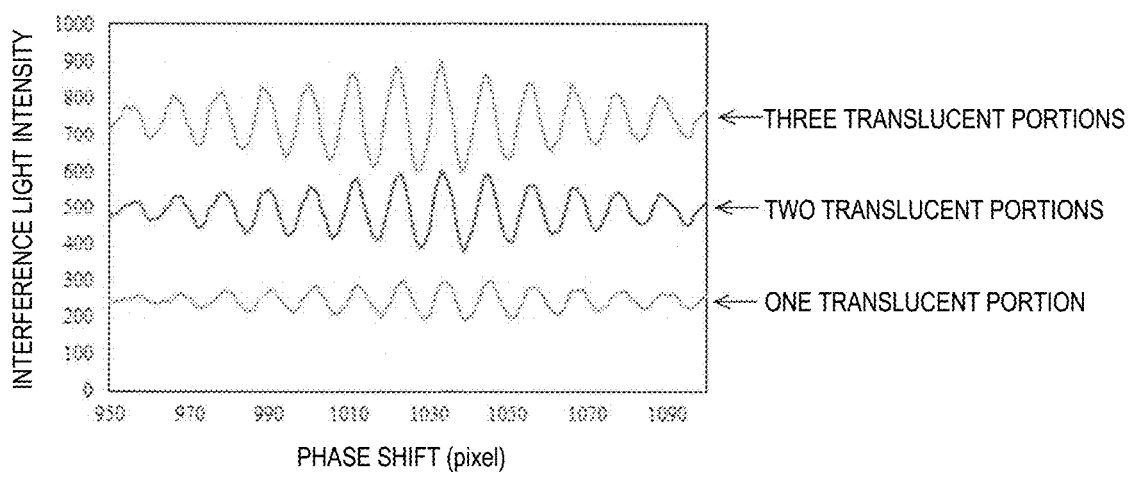
Figure 9B:
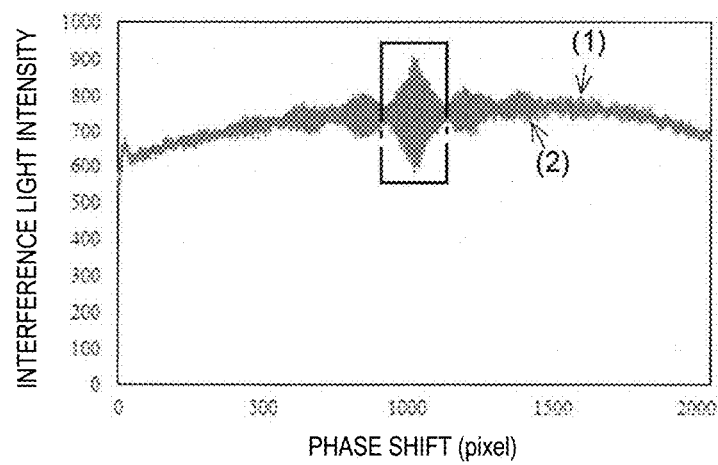
FIGS. 9B(a) and 9B(b) are views showing results of actually measuring an intensity change in an interference image of white light (light source: metal halide lamp) when the light-shielding plate of a comparative example is arranged on the conjugate plane, and FIG. 9B(b) is a view in which a part surrounded by a rectangular frame in FIG. 9B(a) is enlarged in a horizontal axis direction.
Figure 9B:
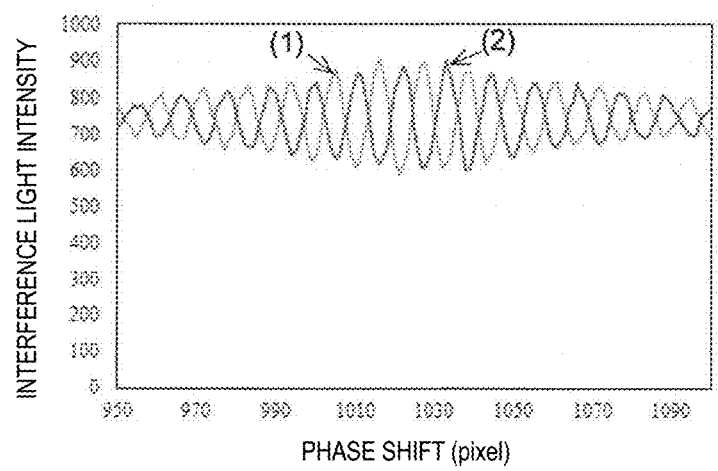

On the other hand, FIGS. 8B(a) to 8B(c) and FIGS. 9B(a) and 9B(b) are experiment results conducted for comparison. In the comparative experiment, the intensity change of each interference image when the light-shielding plate having one translucent portion with the distance L of 15.57 μm was arranged at a predetermined position of the conjugate plane 13C, and the intensity change of each interference image when the light-shielding plate was arranged at a position shifted by 15.57 μm in the second axis direction from the predetermined position were measured. FIGS. 8B(a) to 8B(c) are measurement results when monochromatic light (wavelength=633 nm) emitted from the HeNe laser is incident on the objective lens 15, and FIGS. 9B(a) and 9B(b) are measurement results when white light emitted from the metal halide lamp is incident on the objective lens 15. FIGS. 8B(b) and 9B(b) are obtained by enlarging a part surrounded by a rectangular frame in FIGS. 8B(a) and 9B(a) in the horizontal axis direction. FIG. 8B(c) is obtained by adding the intensity changes of the two interference images shown in FIG. 8B(a).

FIGS. 8A(a) and 8A(b) and FIGS. 9A(a) and 9A(b) indicate that the intensity changes of the interference light when the number of translucent portions is 1 to 3 are all in phase. It was confirmed that the intensity and the amplitude were increased by the increase in the number of the translucent portions, i.e., the definition of the interferogram was improved in the intensity change of the interference light when the number of the translucent portions was one and the intensity change of the interference light when the number of the translucent portions was two or three.

On the other hand, FIGS. 8B(a) to 8B(c) and FIGS. 9B(a) and 9B(b) indicate that the intensity change of the interference light when the translucent portion is at a position deviating by 15.57 μm in the second axis direction has a phase deviating by π. The intensity change of the interference light when the length L of the translucent portion in the second axis direction is 31.14 μm (=15.57 μm×2) is obtained by adding the intensity change indicated by the sign (1) and the intensity change indicated by the sign (2), which have a relationship of canceling each other, and thus the amplitude becomes small. This is also apparent from FIG. 8B(c).

Second Embodiment

Figure 10:
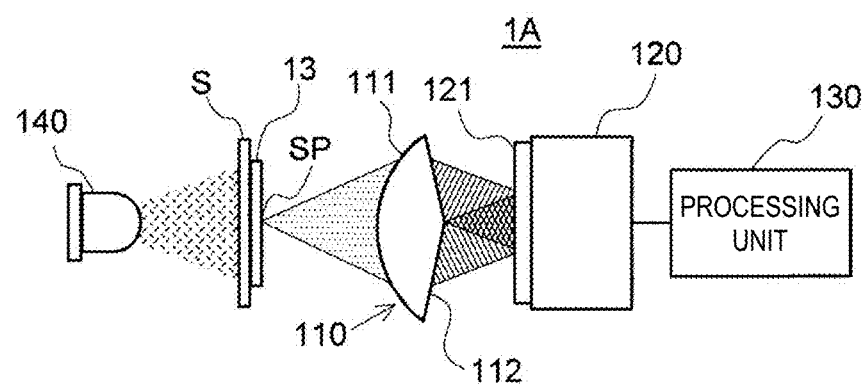
FIG. 10 is a view showing a schematic overall configuration of a spectrometry device according to a second embodiment of the present invention.

FIG. 10 shows a schematic configuration of a spectrometry device of the second embodiment. A spectrometry device 1A includes a transmissive optical element 110, a photodetector 120 having a light-receiving face 121, and a processing unit 130 configured to process a detection signal of the photodetector 120. The photodetector 120 includes a two-dimensional area sensor such as a CCD camera in which a plurality of pixels are two-dimensionally arranged. The transmissive optical element 110 has a light incident face 111 and a light emission face 112 on the back side of it, and is arranged between an object face S and the light-receiving face 121 such that the light incident face 111 faces the side of the object (object face) S to be measured and the light emission face 112 faces the light-receiving face 121 side of the photodetector 120. In this spectrometry device 1A, a light-shielding plate 13A is arranged on the object face S.

Figure 11:
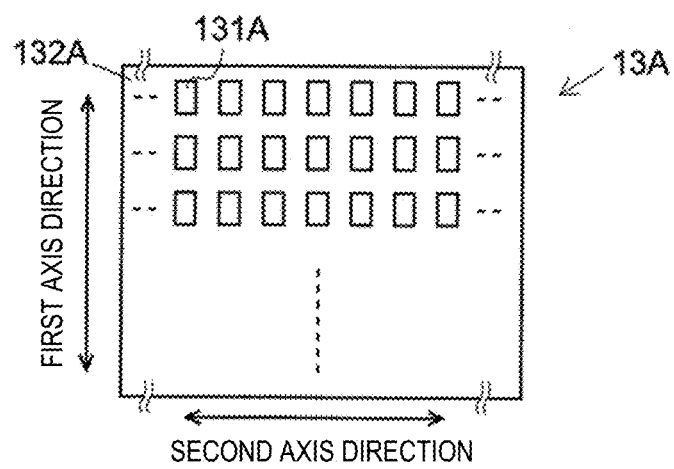
FIG. 11 is a view of the light-shielding plate as viewed from a transmissive optical element side.

FIG. 11 shows a view of the light-shielding plate 13A as viewed from the transmissive optical element 110 side. Similarly to the light-shielding plate 13 of the first embodiment, the light-shielding plate 13A includes a plurality of translucent portions 131A through which light (object light) emitted from an object face can pass, and a light-shielding portion 132A through which the object light cannot pass, the light-shielding portion 132A being a part other than the translucent portions 131A. The translucent portions 131A are arranged in a matrix on the light-shielding plate 13A along the first axis direction and the second axis direction. The translucent portion 131A may be an opening formed on the light-shielding plate 13A, or the translucent portion 131A may be obtained by fitting a member such as glass having translucency into the opening.

Figure 12A:
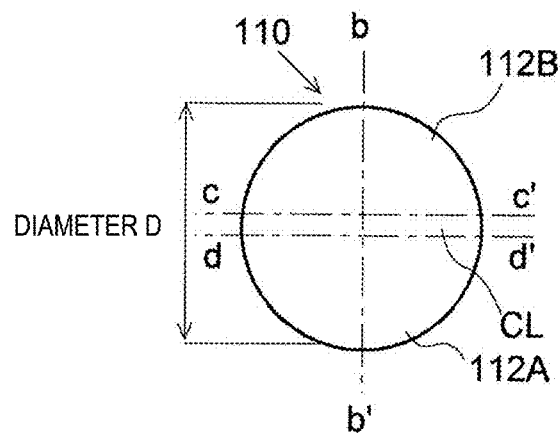
FIGS. 12(a) to 12(d) are views showing a configuration of the transmissive optical element.
Figure 12B:
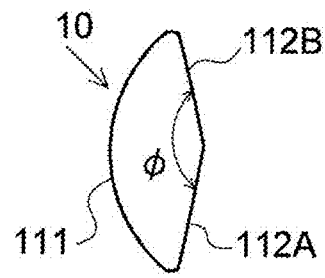
Figure 12C:
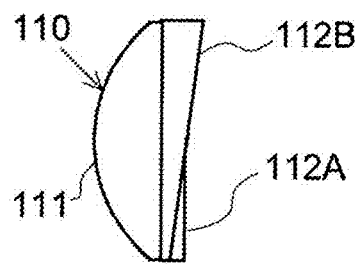
Figure 12D:
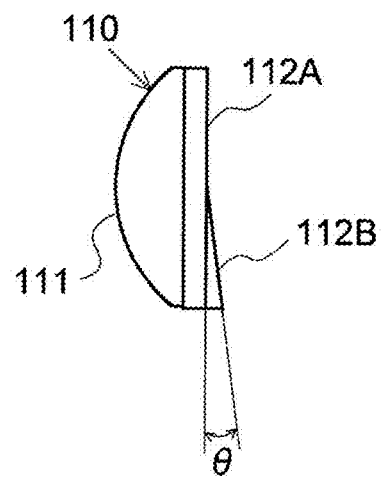
Figure 12E:
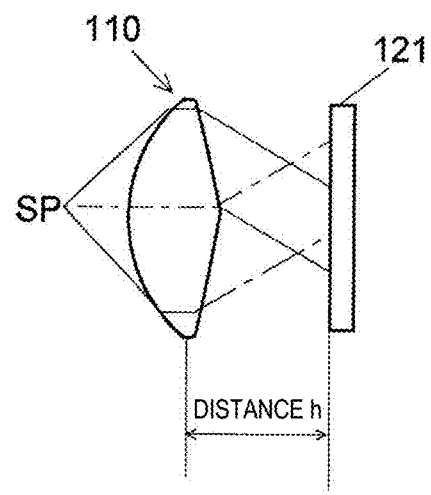
FIG. 12(e) is a view showing a scene in which light having passed through the transmissive optical element enters the light-receiving face of the photodetector.

FIG. 12(a) is a view of the transmissive optical element 110 as viewed from the light emission face 112 side, FIG. 12(b) is a sectional view along the line b-b' in FIG. 12(a), FIG. 12(c) is a sectional view along the line c-c' in FIG. 12(a) as viewed from above the paper surface, FIG. 12(d) is a sectional view along the line d-d' in FIG. 12(a) as viewed from below the paper surface, and FIG. 12(e) is a view showing a scene in which light emitted from the light emission face 112 of the transmissive optical element 110 enters the light-receiving face 121. Here, the top, bottom, right, and left in FIG. 12(a) are the top, bottom, right, and left of the transmissive optical element 110.

As obvious from FIGS. 12(a) to 12(d), the transmissive optical element 110 includes an optical element that is circular when viewed from the light incident face 111 side (or the light emission face 112 side), and the light incident face 111 is configured to have a substantially spherical shape protruding outward. On the other hand, the light emission face 112 includes a planar first light emission face 112A and a planar second light emission face 112B arranged side by side, and they are inclined to the light incident face 111 side downward and upward, respectively, from a center line CL at the center in the up and down direction of the light emission face 112.

The first light emission face 112A is not inclined in the c-c' direction (i.e., the left-right direction) in FIG. 12(a), whereas the second light emission face 112B is inclined by an angle θ to the light incident face 111 side from the sign c to the sign c' in FIG. 12(a). That is, the second light emission face 112B is inclined to the light incident face 111 side upward from the center line CL, and is inclined to the light incident face 111 side from the right side to the left side. Therefore, the first light emission face 112A and the second light emission face 112B are not symmetrical with respect to the center line CL.

With the above configuration, in the spectrometry device 1A of the present embodiment, when light is cast from a light source 140 to the object face S, and a light ray group (object light) such as scattered light and fluorescent light is generated from a measurement point SP positioned at the focal point of the transmissive optical element 110, the light passes through the translucent portions 131A of the light-shielding plate 13A and then is directed to the transmissive optical element 110. Then, the object light incident on the light incident face 111 of the transmissive optical element 110 becomes a parallel light beam (hereinafter referred to as "object beam") and is directed to the light emission face 112 of the transmissive optical element 110. When refracted and emitted from each of the first light emission face 112A and the second light emission face 112B, each beam is divided into the first light beam and the second light beam, and enters the light-receiving face 121 of the photodetector 120. At this time, the traveling directions of the first light beam and the second light beam are determined according to the inclination angles of the first light emission face 112A and the second light emission face 112B, the wavelength of the object beam, and the refractive index difference between the transmissive optical element 110 and the outside (air).

Accordingly, by appropriately selecting the material of the transmissive optical element 110, an angle φ (see FIG. 12(b)) formed by the first light emission face 112A and the second light emission face 112B, a distance h from the transmissive optical element 110 to the light-receiving face 121 of the photodetector 120, and the like, it is possible to cause the first light beam and the second light beam emitted from the first light emission face 112A and the second light emission face 112B, respectively, to enter the light-receiving face 121 so as to overlap each other at least partially. By inclining at an angle θ (see FIG. 12(d)) of the second light emission face 112B with respect to the first light emission face 112A, an optical path length difference occurs between the first light beam and the second light beam, and an interference image of the first light beam and the second light beam is formed in a region on the light-receiving face 121 where the first light beam and the second light beam overlap each other. Accordingly, it is obtained an interferogram of the measurement point SP by detecting the intensity distribution of light of this interference image by the photodetector 120, and it can be obtained the spectral characteristics of the measurement point SP by Fourier-transforming the interferogram by the processing unit 130.

In the present embodiment, a part of the transmissive optical element 110 from the light incident face 111 to the light emission face 112 functions as the combining optical system, and the light emission face 112 functions as the phase shifter. The inclination angle of the second light emission face 112B with respect to the first light emission face 112A when the first light beam and the second light beam are incident in an overlapping manner on the light-receiving face 121 can be designed based on optical conditions such as a measurement wavelength range and wavelength resolution.

Figure 13:
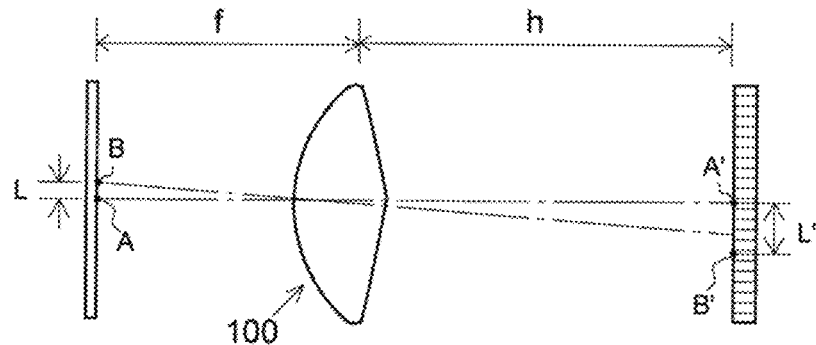
FIG. 13 is a view showing a positional relationship among an object face, the transmissive optical element, and the light-receiving face.

As shown in FIG. 13, when the distance from the transmissive optical element 110 to the object face S (corresponding to the focal length of the combining optical system) is f, and the distance from the transmissive optical element 110 to the light-receiving face 121 of the photodetector 120 is h, the conversion ratio to the conjugate plane, which is the relationship between the distance L between the point A and the point B on the object face S and the distance L' between the points A' and B' corresponding to the points A and B on the light-receiving face 121, is expressed by the following Formula (8).

$$L/L'=f/h \quad (8)$$

Similarly to the spectrometry device of the first embodiment, the relationship among the pixel pitch P of the photodetector 120, the difference Δλ between the optical path length differences of two pixels adjacent to each other in the second axis direction, and the length L' on the light-receiving face 121 is expressed by the following Formula (7).

$$L'=\{(\lambda c/2)/\Delta\lambda\}\times P \quad (7)$$

Accordingly, from Formulas (7) and (8), in the spectrometry device 1A of the second embodiment, L can be obtained from the following Formula (2).

$$L=\{(\lambda c\times f)/(2\times\Delta\lambda\times h)\}\times P \quad (2)$$

Note that the distance h from the transmissive optical element 110 to the light-receiving face 121 of the photodetector 120 corresponds to a sum (h1+h2) of the distance h1 from the combining optical system to the phase shifter and the distance h2 from the phase shifter to the light-receiving face of the photodetector in the present invention. In the present embodiment, the transmissive optical element 110 has a configuration in which the combining optical system and the phase shifter are integrated, and the distance from the combining optical system to the phase shifter is "0". Therefore, the sum is equivalent to the distance from the transmissive optical element 110 to the light-receiving face 121, i.e., the distance from the phase shifter to the light-receiving face.

In the case of the present embodiment, the opening width is determined not only in the second axis direction but also in the first axis direction by the same method. Although the same value is used for the wavelengths λc in the first axis direction and the second axis direction, the opening width in the first axis direction and the opening width in the second axis direction have different values because the difference Δλ between the optical path length differences of the two pixels adjacent to each other in the second axis direction is different.

Third Embodiment

Figure 14A:
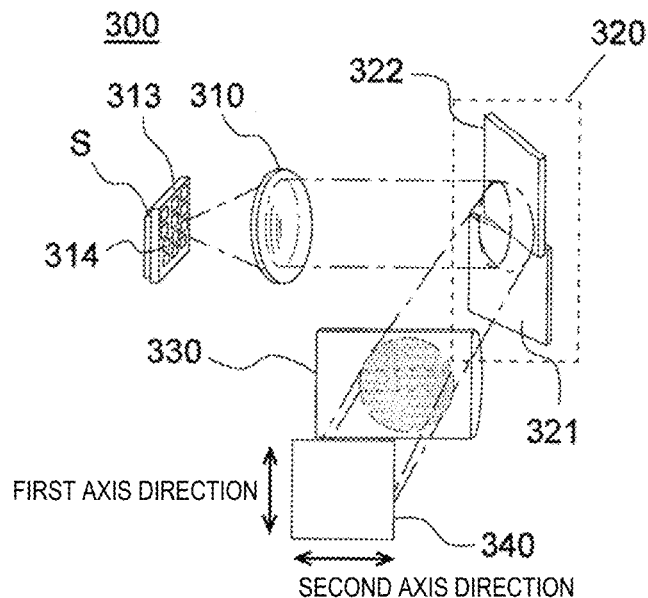
FIG. 14A is a schematic perspective view of a spectrometry device according to a third embodiment of the present invention.

FIG. 14A is a perspective view schematically showing a spectrometry device 300 of the third embodiment. This spectrometry device 300 includes an objective lens (collimator lens) 310, a phase shifter 320 having a reference mirror 321 and an inclined mirror 322, an imaging lens (cylindrical lens) 330, a photodetector 340 having a light-receiving face at a position serving as an imaging plane of the imaging lens 330, and a processing unit (not shown) configured to process a detection signal of the photodetector 340. The photodetector 340 includes a two-dimensional area sensor such as a CCD camera in which a plurality of pixels are two-dimensionally arranged. Both the reference mirror 321 and the inclined mirror 322 have planar reflection faces. In this spectrometry device 300, a light-shielding plate 313 is arranged on the object face S. This light-shielding plate 313 has the same structure as that of the light-shielding plate 13 of the first embodiment.

In the spectrometry device 300, when light is cast from the light source (not shown) to the object face S, and a light ray group (object light) such as scattered light and fluorescent light is emitted from a measurement point on the object face S, the object light passes through a translucent portions 314 of the light-shielding plate 313 and then is directed to the objective lens 310. The object light incident on the objective lens 310 passes through the objective lens 310 to be combined into one parallel light beam (object beam), and is introduced into each reflection face of the reference mirror 321 and the inclined mirror 322 of the phase shifter 320 from oblique directions. Then, the object beams introduced into the respective reflection faces of the reference mirror 321 and the inclined mirror 322 are reflected at the same angle (reflection angle) as the incident angle, and then is directed to the imaging lens 330.

Figure 14B:
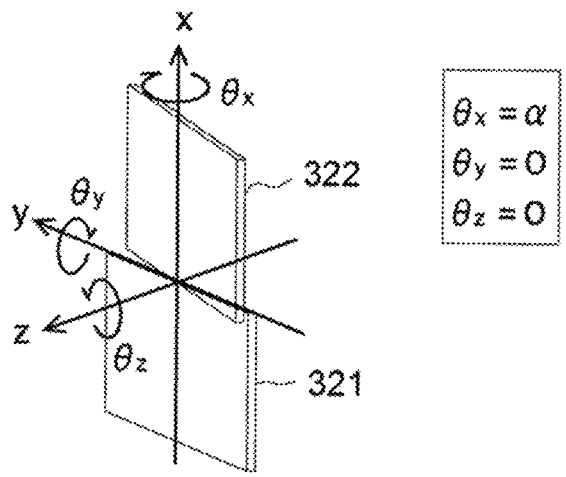
FIG. 14B is a view showing a positional relationship between a reflection face of a reference mirror and a reflection face of an inclined mirror.

FIG. 14B shows a positional relationship between the reflection face of reference mirror 321 and the reflection face of inclined mirror 322. In FIG. 14B, orthogonal coordinate axes defining the reflection face of reference mirror 321 are defined as an x-axis and a y-axis, and the axis orthogonal to the x-axis and the y-axis is defined as a z-axis. In the present embodiment, the objective lens 310 and the reference mirror 321 are arranged so that the optical axis (incident axis) of the object light incident on the reflection face of the reference mirror 321 and an yz plane are parallel to each other. The inclined mirror 322 is installed so that the reflection face when the reference mirror 321 is rotated about the x-axis by a predetermined angle θx with respect to the x-axis defined as described above becomes parallel to a reflection face of inclined mirror 322. As a result, the reflection face of the inclined mirror 322 is inclined in the y-axis direction with respect to the reflection face of the reference mirror 321, and the optical incident angle of the object beam with respect to each reflection face is different. Accordingly, the traveling direction of the light (inclined reflected light) reflected by the inclined mirror 322 deviates by a predetermined angle in the y-axis direction with respect to the traveling direction of the light (reference reflected light) reflected by the reference mirror 321. This deviation angle causes a continuous optical path length difference between the reference reflected light and the inclined reflected light.

Therefore, the reference reflected light and the inclined reflected light incident on the imaging lens 330 and having passed through the imaging lens 330 focus on the light-receiving face of the photodetector 340 to form a linear interference image. By the photodetector 340, it is obtained an interferogram of light emitted from a measurement point on the object face S can be acquired by measuring the change in light intensity along the linear interference image, and it is obtained the spectral characteristics by Fourier-transforming this interferogram.

The spectrometry device 300 described above and the spectrometry device 1 of the first embodiment are different in whether the phase shifter includes a transmissive optical element or a reflection optical element, but the configuration of an imaging optical system configured to image two light beams between which an optical path length difference is given on a light-receiving face of a photodetector and the configuration of the photodetector are substantially the same. Accordingly, also in the present embodiment, the light-shielding plate 313 can be designed in the same manner as in the first embodiment, and the definition of the interferogram can be enhanced by arranging such the light-shielding plate 313 on the object face S.

Fourth Embodiment

There are various configurations of the spatial phase shift interference optical system, and the conversion ratio to the conjugate plane is determined according to the configuration of each optical system. The examples of the wave front division type interference optical system configured to divide, into two, the wave front of the object light combined into the parallel light beam by the combining optical system (objective lens) have been described up to the third embodiment, but there is a Michelson interferometer shown in FIG. 15A other than the above. The Michelson interferometer is one of the most typical interference optical systems, and is an amplitude division interference optical system configured to convert a light beam generated from the object face S into a parallel light beam by an objective lens 410 and divides the parallel light beam into two in terms of light amount by a half mirror 420.

Figure 15A:
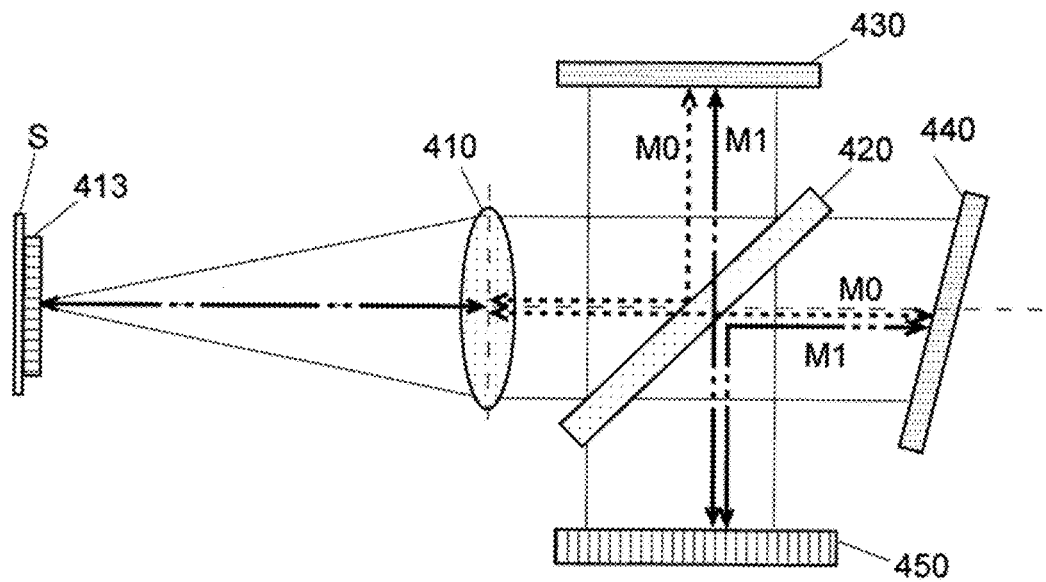
FIG. 15A is a view schematically showing an amplitude division interference optical system constituting a spectrometry device according to a fourth embodiment of the present invention.

The parallel light beam divided into two by the half mirror 420 enters two mirrors 430 and 440. By inclining the mirror 440 on one side of the two mirrors 430 and 440, an interference fringe due to spatial phase shift interference is formed on the imaging plane. Since a plurality of pixels (not shown) included in a light-receiving device 450 are arranged on the imaging plane, an interference fringe can be observed from the detection result of the light-receiving device 450. In FIG. 15A, the optical path length difference becomes 0 at a point on the imaging plane where the distance indicated by reference sign M0 and the distance indicated by reference sign M1 are the same. The intensity distribution of this interference fringes is an interferogram, and spectral characteristics can be acquired by Fourier-transforming this.

In this embodiment, the half mirror 420 and the mirrors 430 and 440 constitute a phase shifter. The half mirror 420 also functions as an interference portion.

Figure 15B:
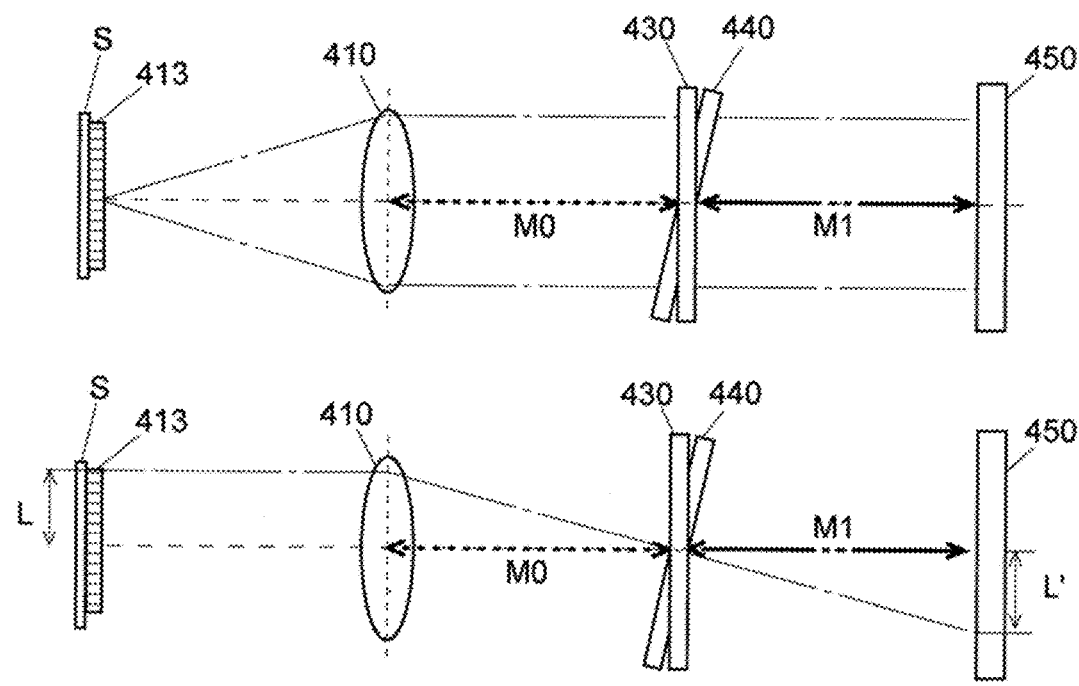
FIG. 15B is a view showing a transmissive equivalent optical system of the amplitude division interference optical system shown in FIG. 15A.

Also in the interference optical system having the above configuration, the interference definition can be improved by arranging a light-shielding plate 413 on the object face S or a face conjugate with the object face S with respect to the objective lens 410. FIG. 15A shows an example in which the light-shielding plate 413 is arranged on the object face S. For easy understanding of the conversion ratio to the conjugate plane in the optical system of FIG. 15A, a transmissive equivalent optical system is shown in FIG. 15B. As shown in FIG. 15B, in the case of the optical system in which the distance M0 and the distance M1 are equal to the distance (i.e., the focal length of the objective lens 410) from the objective lens 410 to the object face S, the conversion ratio to the conjugate plane is expressed by the following Formula (9).

$$L/L' = M0/M1 \quad (9)$$

REFERENCE SIGNS LIST 1, 1A, 300 . . . Spectrometry Device
100 . . . Conjugate Plane Imaging Optical System
21, 120, 340 . . . Photodetector
21A, 121 . . . Light-Receiving Face
211 . . . Pixel
13, 13A, 313, 413 . . . Light-Shielding Plate
131, 131A, 314 . . . Translucent Portions
132, 132A . . . Light-Shielding Portion
15, 310 . . . Objective Lens
17 . . . Imaging Lens
19, 320 . . . Phase Shifter
191 . . . First Transmission Portion
192 . . . Second Transmission Portion
110 . . . Transmissive Optical Element
130 . . . Processing Unit
13C . . . Conjugate Plane
S . . . Object Face

The invention claimed is:

1. A spectrometry device comprising:
   a) a combining optical system configured to combine rays of light emitted from a measurement point on an object face into one single parallel light beam;
   b) a photodetector having a light-receiving face on which a plurality of pixels are arrayed at predetermined intervals along a predetermined direction;
   c) a phase shifter configured to generate a first light beam and a second light beam by dividing the parallel light beam in a first axis direction, and configured to provide an optical path length difference between the first light beam and the second light beam, the optical path length difference changing continuously along a second axis direction perpendicular to the first axis direction;
   d) an interference portion configured to generate interference light by causing the first light beam and the second light beam to interfere with each other in a linear region along the second axis direction on the light-receiving face, where an optical path length difference is given between the first light beam and the second light beam by the phase shifter;
   e) a light-shielding member having a plurality of translucent portions arrayed at predetermined intervals along the second axis direction, the light-shielding member being arranged on the object face or a surface optically conjugate with the object face with respect to the combining optical system; and
   f) a processing unit configured to obtain an interferogram of the measurement point based on an intensity distribution of the interference light detected by the photodetector, and configured to acquire a spectrum by Fourier-transforming the interferogram, wherein
   there is a predetermined relationship between a length of each of the translucent portions of the light-shielding member in the second axis direction and an interval between two translucent portions adjacent to each other in the second axis direction, and a wavelength of light emitted from the measurement point, a distance from the combining optical system to the phase shifter, a distance from the phase shifter to a light-receiving face of the photodetector, an interval of the pixels in the second axis direction, and a difference in optical path length difference given to each of two pixels adjacent to each other in the second axis direction.

2. The spectrometry device according to claim 1, wherein the combining optical system includes a collimator lens.

3. The spectrometry device according to claim 1, wherein the light-shielding member has a plurality set of the plurality of translucent portions along the first axis direction, and
   the length of the translucent portions and the interval between two translucent portions adjacent to each other in the second axis direction in at least one set of the plurality sets of the plurality of translucent portions are different from the length of the translucent portions and the interval between two translucent portions adjacent to each other in the second axis direction in other set of the plurality sets of the plurality of translucent portions.

4. A spectrometry device comprising:
a) a combining optical system configured to combine rays of light emitted from a measurement point on an object face into one single parallel light beam;
b) a phase shifter configured to divide the parallel light beam into two in a predetermined first axis direction to form a first light beam and a second light beam, and configured to provide an optical path length difference between the first light beam and the second light beam, the optical path length difference continuously changing along a second axis direction orthogonal to the first axis direction;
c) an imaging optical system configured to focus, in the first axis direction, the first light beam and the second light beam between which an optical path length difference is given by the phase shifter, on an imaging plane, to form a linear interference image along the second axis direction;
d) a photodetector having a light-receiving face on the imaging plane and having a plurality of pixels for detecting a light intensity distribution of the linear interference image;
e) a light-shielding member having a plurality of translucent portions arrayed at predetermined intervals in the second axis direction, the light-shielding member being arranged on the object face or on a surface optically conjugate with the object face with respect to the combining optical system; and
f) a processing unit configured to obtain an interferogram of the measurement point based on an intensity distribution of light in a linear region detected by the photodetector, and configured to acquire a spectrum by Fourier-transforming the interferogram, wherein
when a focal length of the combining optical system is f1, a focal length of the imaging optical system is f2, an interval of pixels of the photodetector in the second axis direction is P, a difference in optical path length difference given to each of two pixels adjacent to each other in the second axis direction is $\Delta\lambda$, a predetermined wavelength included in a wavelength range of light emitted from the measurement point is $\lambda c$, and both a length of each of the translucent portions of the light-shielding member in the second axis direction and an interval of two translucent portions adjacent to each other in the second axis direction are L, L is expressed by a following Formula (1)

$$L=\{(\lambda c \times f1)/(4 \times \Delta\lambda \times f2)\} \times P \quad (1).$$

5. The spectrometry device according to claim 4, wherein the phase shifter includes a first transmission portion having a planar light-lead-in face and a planar light-lead-out face, and a second transmission portion arranged side by side with the first transmission portion in the first axis direction and having a planar light-lead-in face and a planar light-lead-out face, and one of the light-lead-in face and the light-lead-out face of the first transmission portion is inclined with respect to the light-lead-in face or the light-lead-out face of the second transmission portion corresponding to the one of the light-lead-in face and the light-lead-out face of the first transmission portion.

6. The spectrometry device according to claim 4, wherein the phase shifter includes a first mirror having a planar light reflection face and a second mirror arranged side by side with the first mirror in the first axis direction and having a planar light reflection face, and the light reflection face of the second mirror is inclined with respect to the light reflection face of the first mirror.

7. The spectrometry device according to claim 4, wherein the combining optical system includes a collimator lens.

8. The spectrometry device according to claim 4, wherein the light-shielding member has a plurality set of the plurality of translucent portions along the first axis direction, and
the length of the translucent portions and the interval between two translucent portions adjacent to each other in the second axis direction in at least one set of the plurality sets of the plurality of translucent portions are different from the length of the translucent portions and the interval between two translucent portions adjacent to each other in the second axis direction in other set of the plurality sets of the plurality of translucent portions.

9. A spectrometry device comprising:
a) a combining optical system configured to combine rays of light emitted from a plurality of measurement points on an object face into one single parallel light beam;
b) a photodetector having a plurality of pixels arranged on a light-receiving face;
c) a phase shifter configured to divide a parallel light beam combined in the combining optical system into two in a predetermined first axis direction to form a first light beam and a second light beam, configured to emit the parallel light beam toward the light-receiving face while providing an optical path length difference between the first light beam and the second light beam, the optical path length difference continuously changing along a second axis direction orthogonal to the first axis direction, and configured to cause the first light beam and the second light beam to planarly enter the light-receiving face so that at least a part of an incident region of the first light beam on the light-receiving face and at least a part of an incident region of the second light beam overlap with each other;
d) a light-shielding member having a plurality of translucent portions arrayed at predetermined intervals in the second axis direction, the light-shielding member being arranged on the object face or on a surface optically conjugate with the object face with respect to the combining optical system; and
e) a processing unit configured to obtain an interferogram at the measurement point based on an intensity distribution of light along the second axis direction in a region where an incident region of the first light beam and an incident region of the second light beam on the light-receiving face overlap, and configured to acquire a spectrum by Fourier-transforming the interferogram, wherein
when a focal length of the combining optical system is f, a distance from the combining optical system to the phase shifter is h1, a distance from the phase shifter to the light-receiving face is h2, an interval of the plurality of pixels in the second axis direction is P, a difference in optical path length difference given to each of two pixels adjacent to each other in the second axis direction is $\Delta\lambda$, a predetermined wavelength included in a wavelength range of light emitted from the measurement point is $\lambda c$, and both a length of each of the translucent portions of the light-shielding member in the second axis direction and an interval of two translucent portions adjacent to each other in the second axis direction are L, L is expressed by a following Formula (2)

$$L=[(\lambda c \times f)/\{2\times \Delta\lambda \times (h1+h2)\}]\times P \qquad (2).$$

10. The spectrometry device according to claim 9, wherein
the phase shifter includes a first transmission portion having a planar light-lead-in face and a planar light-lead-out face, and a second transmission portion having a planar light-lead-in face and a planar light-lead-out face, and is configured so that an optical axis of the second light beam emitted from the light-lead-out face of the second transmission portion is inclined with respect to an optical axis of the first light beam emitted from the light-lead-out face of the first transmission portion.

11. The spectrometry device according to claim 9, wherein
the phase shifter has a first planar reflection face and a second planar reflection face arranged side by side so that the parallel light beam enters from an oblique direction, and
the first planar reflection face and the second planar reflection face are configured so that an incident angle of the parallel light beam with respect to the first planar reflection face and an incident angle of the parallel light beam with respect to the second planar reflection face are different from each other, and a light incident face of the parallel light beam with respect to the first planar reflection face and a light incident face of the parallel light beam with respect to the second planar reflection face are different from each other.

12. The spectrometry device according to claim 9, wherein
the combining optical system includes a collimator lens.

13. The spectrometry device according to claim 9, wherein
the light-shielding member has a plurality set of the plurality of translucent portions along the first axis direction, and
the length of the translucent portions and the interval between two translucent portions adjacent to each other in the second axis direction in at least one set of the plurality sets of the plurality of translucent portions are different from the length of the translucent portions and the interval between two translucent portions adjacent to each other in the second axis direction in other set of the plurality sets of the plurality of translucent portions.

* * * * *